United States Patent
Factor et al.

(10) Patent No.: US 7,334,730 B1
(45) Date of Patent: Feb. 26, 2008

(54) MACHINE-READABLE MEDIUM AND PROGRAM INSTRUCTIONS FOR ASSEMBLING AND SHIPPING AN ITEM IN A SECURE ENVIRONMENT

(75) Inventors: Ronald D. Factor, Houston, TX (US); William Robert Grimes, Kent, WA (US)

(73) Assignee: Airis Holdings, LLC, Houston, TX (US)

( * ) Notice: Subject to any disclaimer, the term of this patent is extended or adjusted under 35 U.S.C. 154(b) by 0 days.

(21) Appl. No.: 11/733,061

(22) Filed: Apr. 9, 2007

(51) Int. Cl.
*G07B 15/02* (2006.01)

(52) U.S. Cl. .................. 235/384; 235/375; 235/487

(58) Field of Classification Search ............... 235/384, 235/385, 487, 486, 375; 705/22, 28–29; 340/572.1
See application file for complete search history.

(56) References Cited

U.S. PATENT DOCUMENTS 7,176,800 B2* 2/2007 Sajkowsky ............ 340/572.1
2005/0236478 A1* 10/2005 St. Clair et al. ............ 235/384
2005/0236479 A1* 10/2005 Schmidtberg et al. ...... 235/384
2005/0283388 A1* 12/2005 Eberwine et al. ............ 705/4
2006/0220857 A1* 10/2006 August et al. ........... 340/572.1
2007/0112574 A1* 5/2007 Greene ........................ 705/1
2007/0244817 A1* 10/2007 Dolivo et al. ................ 705/50

\* cited by examiner

*Primary Examiner*—Thien M. Le
*Assistant Examiner*—Edwyn Labaze
(74) *Attorney, Agent, or Firm*—Buskop Law Group, PC; Wendy Buskop

(57) ABSTRACT

A machine-readable medium connected to a network, having a processor, a data storage, an input device, and a display, containing computer instructions for instructing a processor to receive a first data related to at least one component for assembly of at least one assembled item, transport the at least one component to an assembly area for assembling the at least one assembled item, receive a second data related to the at least one assembled item for readying the at least one assembled item for shipment, store the second data in the data storage, and move the at least one assembled item to a designated storage area within the security cleared space for storage or to an aircraft connected to the security cleared space. A machine-readable medium having computer instructions for disassembling an assembled item into components for shipment or storage is also contemplated.

26 Claims, 5 Drawing Sheets

MACHINE-READABLE MEDIUM AND PROGRAM INSTRUCTIONS FOR ASSEMBLING AND SHIPPING AN ITEM IN A SECURE ENVIRONMENT

FIELD

The present embodiments relate to a machine-readable medium having computer instructions for assembling and shipping an item using a security cleared space connected to a port authority, and to a machine-readable medium having computer instructions for receiving an assembled item, disassembling the item, and shipping the screened components using a security cleared space connected to a port authority.

BACKGROUND

A need exists for a machine-readable medium having computer instructions able to ensure safety and compliance with United States Transportation Security Administration and International Air Transport Association requirements that allows for the assembly of items within a security cleared area and shipment of the items from the security cleared area.

A further need exists for a machine-readable medium having computer instructions able to ensure safety and compliance with International Air Transport Association and United States Transportation Security Administration requirements that allow for the receipt of assembled items, disassembly of items within a security cleared area, and shipment of the components from the security cleared area There exists a need for a assembly facility using a machine-readable medium having computer instructions integrated with a cargo terminal to improve on-time delivery and reduce inventory storage. The integration of assembly facilities with a port authority, including an aircraft terminal, will be further enhanced by the introduction of a sophisticated information linkage between handling systems. Manufacturers will immediately be able to track the status of shipments and schedule their activities accordingly.

There exists a need for a security cleared assembly facility using a machine-readable medium having computer instructions connected to a port authority that will reduce the number of errors in the delivery cycle, reduce damage to sub-assemblies and finished products, and will reduce handling costs.

There further exists a need for a security cleared assembly facility using a machine-readable medium having computer instructions connected to a port authority that will control the flow of good, achieve a higher quality of service, and will optimize transport security between the assembly facility and the cargo facility.

There additionally exists a need for a machine-readable medium having computer instructions capable of automating one or more parts of an assembly or disassembly process, including screening, manufacturing, labeling, packaging, sealing, storing, and readying for shipment.

The present embodiments meet these needs.

BRIEF DESCRIPTION OF THE DRAWINGS

The detailed description will be better understood in conjunction with the accompanying drawings as follows.

Figure 1:
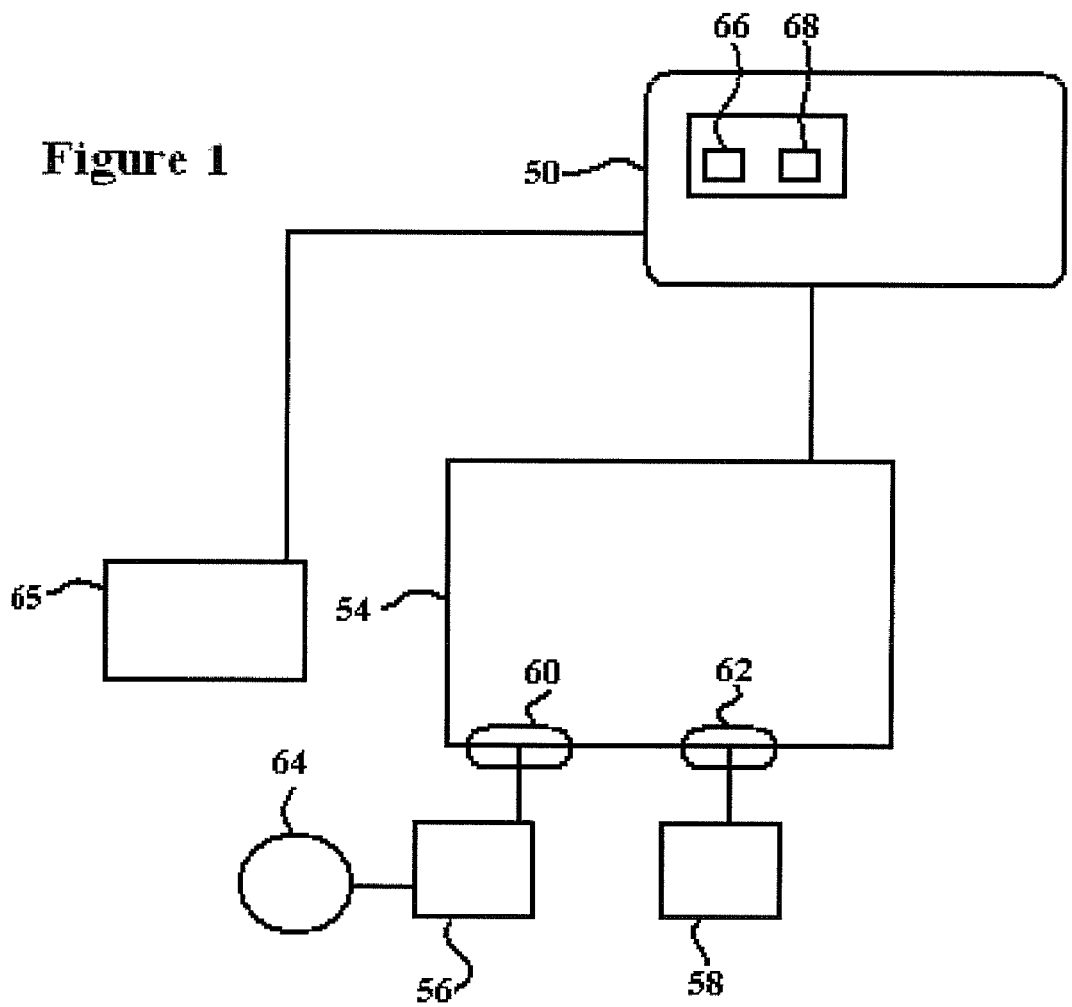
FIG. 1 depicts a schematic representation of a computer system usable with the embodied machine-readable medium.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Traditionally, product assembly facilities are not located immediately adjacent port authorities, primarily due to high land costs. However, in today's hi-tech global environment of thinning margins and shrinking markets, manufacturers are seeking methods to eliminate every inefficiency from the supply line to reduce time and costs from product assembly and distribution to market. The present machine-readable medium having computer instructions is used as part of an assembly facility integrated with a port authority cargo facility, via a sterile connecting system, which eliminates an expensive transport segment from the traditional supply chain, reducing both cost and risk.

The present machine-readable medium having computer instructions can facilitate, or even automate the delivery of pre-manufactured parts and sub-assemblies to a security cleared space for final assembly, or the delivery of assembled items for disassembly, and the readying of completed products for shipping. Finished products or components are then shipped from the site via cargo carriers serving the adjacent port authority. This grants tremendous market reach to manufacturers and distributors utilizing the security cleared space for assembly or disassembly and shipping, while packaging the entire assembly and distribution process into a single, self-contained, closed-loop facility.

The present machine-readable medium having computer instructions provides enhanced security, utilizing a security cleared space.

Components and assembled items that enter the security cleared space are screened according to United States Transportation Security Administration and International Air Transport Association requirements, including Regulations (EU) 2320/2002, 622/2003, 1138/2004, 781/2004, 831/2006, pending 49 CFR §1550 as of April of 2007, and the ECAC Policy Statement in the Field of Civil Aviation Facilitation, 8th Edition, as of January of 2001.

Persons that enter the security space are similarly screened, such as by using x-rays, air jet analyzers, metal detectors, and use of gamma rays for screening for drugs and other chemicals. Additionally, radioactivity detectors can be used. The present machine-readable medium having computer instructions can facilitate, automate, or store data relating to the screening of all vehicles connected to the security cleared space or that are allowed to enter the space in compliance with the above requirements as well, which may include thorough inspection of the vehicle, use of gamma rays as described previously, swabbing for explosives in the vehicles, or removing portions of the vehicle, such as removal and inspection of the contents of door panels.

An additional advantage of the present machine-readable medium having computer instructions is that the present machine-readable medium having computer instructions provides increased cost and time efficiency over conventional security measures and assembly practices.

Using the present machine-readable medium having computer instructions, the assembly or disassembly of items is performed on-site at a port authority, such as at an airport, and assembled or disassembled items can be shipped directly and immediately, through an automated process, reducing the time and costs related to handling and transporting assembled or disassembled items to a port authority for shipment.

Use of the present machine-readable medium having computer instructions with related facilities further allows for use of a single consolidated point for security clearance, so that all components, persons, and assembled and disassembled items can be screened and secured at a single location. This reduces costs and time required for security compliance, creating a lower price for customers, assemblers, and operators. The consolidated screening process is contemplated to be twice as fast as decentralized screening.

Use of the present machine-readable medium having computer instructions with related facilities also allows for the creation of a free trade zone, bonded storage, or assembly facility by a customs agency. This allows for the reduction or elimination of all import and export tariffs relating to components and items delivered to or shipped from the security cleared space.

Aircraft or other vehicles, such as ships, trucks, and other conveyance means, are connected with the security cleared space throughout the process, further improving the efficiency of the present method by allowing for direct and immediate transport of items to and from vehicles connected to the site. The security cleared space can also allow for the manufacture of components in addition to the assembly of components, negating a need for separate manufacturing sites and additional screening to transport manufactured components into the security cleared space.

The present Use of the present machine-readable medium having computer instructions with related facilities can further be adapted to perform one or more steps of the screening, assembly, and disassembly processes using automated means. A computerized process can move assembled or disassembled items into storage or into an aircraft or other vehicles for automatic shipment. Computerized processes can also facilitate, or even automate, portions of the assembly or disassembly process.

The present machine-readable medium having computer instructions can apply and scan labels, such as scannable bar codes or radio frequency identification tags, to further enhance efficiency and to facilitate the automation of one or more steps of the method. Manifests, clearance forms, labels, or similar documentation can be scanned and transmitted while a shipment is en-route, further increasing the efficiency of the present method.

The port authority as referred to in these embodiments can be an airport, a military post, a ship terminal, a rail facility or terminal, ferry terminals, tricking facilities, other intermodal facilities, and other similar facilities whether public or private.

The present machine-readable medium is connected to one or more networks, such as the Internet, a local area network, a wide area network, a cellular network, a satellite network, a fiber optic network, a telephone system, or combinations thereof. The machine-readable medium also has a processor, a data storage, a display, and at least one input device, such as a laptop, a personal digital assistant, a cellular telephone, a pager, or other similar data input devices, such as a keyboard, a mouse, or a touch screen.

The present machine-readable medium also has computer instructions for instructing a processor to receive a first data from the input device with information relating to one or more components for assembly of an assembled item. It is contemplated that the one or more components can be screened according to International Air Transport Association and United States Transportation Security Administration requirements.

The first data relating to the one or more components can be stored in the data storage.

The computer instructions can further instruct the processor to cause the transport of the one or more components related to the first data to an assembly area in a security cleared space. The security cleared space can be connected to a port authority and can be a secured area under the International Air Transport Association requirements and United States Transportation Security Administration requirements for cargo security policies.

The security cleared space can be any kind of space, such as a designated space enclosed by walls and gates, an open area designated by markings on the wall and floors, a building, a temporary building, an inflatable structure, a pre-manufactured building, or other similar structures or areas.

It is contemplated that the security cleared space can be leased to one or more users. It is further contemplated that the leasing of the security space can include using the present machine readable medium having computer instructions to receive user-related data and store the user-related data in the data storage. In an embodiment, the leasing of the security cleared space can be at least partially automated.

In an embodiment, the security cleared space can be a pair of connected, multilevel buildings, wherein the air side building receives delivered components and assembled items, such as from an aircraft, which are transferred to a designated area of the non-air side building for assembly or disassembly. Finished products are then transferred to the air side building for shipment.

Multiple buildings can be connected using elevated connections, such as bridges or skyways, surface connections, such as ground level hallways, covered walkways, sidewalks, or doors, or underground connections such as tunnels. Likewise, aircraft and other vehicles can load and unload cargo into air side buildings using elevated connections, surface connections, or underground connections. It is contemplated that the connection between buildings can include a conveyer system.

Single story buildings containing multiple areas, facilities, or zones within the single story can also be used. It is contemplated to use buildings of any height with any number of stories, including from three to ten levels of lease space. It is further contemplated that the height and number of levels within each building can be governed by aeronautical height restrictions. Levels can include parking areas, truck docks, assembly or disassembly areas, pallet build up and break down areas, storage areas, vertical and horizontal conveyance systems, and other areas and equipment.

It is contemplated that individual levels of a building can be leased to different individual users. It is also contemplated that individual assembly or disassembly areas within a single level of a building can be leased to different individual users. Any combination of levels and assembly areas can be leased to any combination of users.

Exemplary users can be a manufacturing company, such as a computer or a cell phone manufacturer, an assembly company, a distribution company, such as an automobile parts or medical equipment distributor, an individual, a partnership, an association or other business organization, such as a pharmaceutical or nonprofit organization.

The security cleared space can be connected a port authority, such as an airport, a seaport or ship terminal, a rail depot or terminal, a truck depot, and other similar conveyance areas, and can qualify as a secured area meeting United States Transportation Security Administration and International Air Transport Association requirements for cargo security policies.

It is further contemplated that the security cleared space can be custom designed for a particular assembly purpose, such as to meet the needs of a particular electronics or garment manufacturer. For example, the assembly or disassembly of ski clothing containing I-pods™ within a sleeve, which constitutes a high value, time-sensitive, seasonal product, may require various modification or customization of a security cleared space.

The transporting of the one or more components to the assembly area of the security cleared space can be partially or fully automated. An automated transport process can include using automated storage and retrieval modules (ASRM), such as those made by Seimens Dematic from Germany and the United States, elevating tracked vehicles (ETV), such as those made by Mitsubishi of Japan, power rollers or power ball decks, such as those made by Lödige of Germany, tracked vehicles (TV), such as a trailer on rails or inlaid track or a tracked vehicle manufactured by Mannesmann of Germany, or other similar equipment.

One or more components can be obtained through delivery to the security cleared site from vessels, such as land based, sea based, or air based vessels, from storage within the security cleared site, or components can be manufactured within the security cleared site. It is contemplated that each component can be screened according to United States Transportation Security Administration and International Air Transport Association requirements prior to its entry into the security cleared space.

It is contemplated that the one or more components can be assembled in the security cleared space, creating an assembled item. The assembly of the assembled item can be performed by creating an assembly line in the security cleared area, or through other means. The assembly can be performed using any conventional tools, processes, personnel, or steps necessary to create the assembled item, such as a conveyor belt or a power roller deck. A conveyor system could use smart pallets and a wireless network to communicate with personnel, identify parts and locations within the security cleared space, and facilitate the assembly process within the secure environment.

One or more persons can be screened for entry into the security cleared space. It is contemplated that the screening of the one or more persons can be done according to United States Transportation Security Administration and International Air Transport Association requirements. It is further contemplated that the screening of the one or more persons can be at least partially automated using the present machine-readable medium having computer instructions. Personnel-related data can be input using an input device, received by the processor, and stored in the data storage.

The number of personnel working within the security cleared space can range from about 5 to about 5,000 or more depending upon the size and location of the area. Exemplary personnel can be a line operator, a manager, a foreman, a forklift operator, an administrator, a floor operator, a broker, a forwarder, a customs official, a treasury official, a drug enforcement agent and associated animals, a customs agent, a ground handling operator, a medical personnel, an engineer, a building engineer, a safety personnel, a leasing agent, an airport authority administrator, an airline official, a pilot or crew member, a load manager, a ramp operator, a ramp manager, a life, safety, and code compliance official, a security officer, a police officer, a food delivery personnel, a cleaning personnel, a United States Department of Agriculture personnel, other similar persons, and combinations thereof.

It is also contemplated that the assembly process can be partially or fully automated. The present machine-readable medium can have computer instructions for instructing a processor to cause the assembly of the one or more components to create the assembled item. The computer instructions can instruct the processor to activate and manipulate equipment as necessary for assembly of the assembled item, such as by using an automated assembly line including smart pallets and a computer controlled processing unit.

In an embodiment, the machine-readable medium can have computer instructions for facilitating the assembly process, such as by transmitting and/or displaying information regarding one or more components or assembled items to personnel within the security cleared space. The information can include a bar code or serial number, destination coordinates, shipping dates, shipping methods, insured value, quantity, owner, shipper, forwarder, customs information, hazardous cargo information, similar types of information including the location of the components in the security cleared space, and combinations thereof.

It is contemplated that the machine-readable medium can include computer instructions for instructing the processor to display a list of items to be assembled from the one or more components on a display. For example, a displayed list may instruct personnel to assemble 200 Ipods™ then 1000 toasters using the one or more components.

It is also contemplated that the machine-readable medium can include computer instructions for causing the processor to display a message on the display indicating that the assembled item is to be assembled from the one or more components at the assembly area. For example, a message indicating, "use these components to assemble a television" can be displayed.

The present machine-readable medium further has computer instructions for instructing a processor to receive a second data indicating that the one or more components have been assembled into the assembled item. The second data can be input using one or more input devices. The second data can be stored in the data storage.

The second data can further contain additional information or instructions, such as indicating that the assembled item is to be stored or readied for shipping. The machine-readable medium can have computer instructions for instructing the processor to cause the assembled item to be assigned a manifest.

The present machine-readable medium additionally has computer instructions for instructing the processor to cause the transport of the assembled item to a designated storage area or to a transshipment area for loading onto a vehicle connected to the security cleared space in compliance with International Air Transport Association and United States Transportation Security Administration requirements for shipment. It is also contemplated that the computer instructions can instruct the processor to cause the transport of the assembled item directly into the vehicle.

A vehicle can include an aircraft, a ship or vessel, a truck, or any other type of vehicle able to transport an assembled item.

This movement of the assembled item into the designated storage area, the transshipment area, or the vehicle done using computer instructions for an automated process controlled by the processor, as described previously, such as by using conveyer belts and power rollers or similar equipment.

The present machine-readable medium can further include computer instructions that instruct the processor to provide a report to at least one operator concerning at least one stage of assembly, disassembly, transport, or storage of one or more components, assembled items, or combinations thereof.

In an embodiment, the present machine-readable medium can be connected to multiple networks. A single network can be in communication with all levels and all users of the security cleared space, individual networks can be in communication with individual users, or any combination of networks can be in communication with any combination of levels and assembly areas. It is contemplated that the one or more networks can have secure log in means, password protection, and can include possible biometric files, such as voice print, retinal, or fingerprint files for users to ensure enhanced security.

It is contemplated that the present machine-readable medium can have two or more gateway protocols for inputting the first data, the second data, or combinations thereof using at least one input device. It is further contemplated that any number of input devices can individually or simultaneously access data within the data storage through any number of gateway protocols.

In an embodiment, the present machine-readable medium can include computer instructions for instructing the processor to label each assembled item or a group of packaged assembled items. The labeling can be done using a label separate from the assembled item, such as an adhesive label, or by directly labeling the assembled item. The label can be a bar code, a radio frequency identification tag, a check character, text, or combinations thereof.

In a contemplated embodiment, the machine-readable medium can include computer instructions for instructing the processor to scan the label, forming scanned data, and transmit the scanned data to one or more insurance carriers for initiating insurance coverage for a member of the group consisting of: a manufacturer, an assembler, a broker, a forwarder, a shipper, a carrier, a customer, or combinations thereof. The scanned data can be archived in the data storage.

The machine-readable medium can include computer instructions for instructing the processor to perform or facilitate other steps that are required by one or more insurance carriers to obtain insurance coverage.

The label can also be a manifest clearance form for enabling clearing of the at least one assembled item or the group of assembled items. In an embodiment, the machine-readable can include computer instructions for instructing the processor to scan the manifest clearance form, forming scanned manifest data, and transmit the scanned manifest data to the one or more networks and a designated internet protocol address for enabling clearing of the assembled item or group of assembled items. This can be done while en route from the security cleared space to a delivery point outside the security cleared space. The scanned manifest data can be archived in the data storage.

Traditional manifests have failed to identify a specific floor or a zone within a building which an item is to be delivered or located. The disclosed use of a manifest clearance form allows a user operator or shipper to identify in the manifest the precise location of screened and cleared items, whether they are components, assembled items or disassembled items.

It is contemplated that the present machine-readable medium can further have computer instructions for instructing the processor to activate a sealing means to seal the assembled item or a group of assembled items. Sealing can be performed using one or more aluminium metal containers, such as Unit Load Devices (ULD), one or more cargo pallets with nets, tamper proof tape, such as that made by 3M of Minnesota, one or more tamper proof crates, such as wooden crates, or combinations thereof.

Sealing of the assembled items prevents tampering of sealed items and allows personnel to quickly and visually determine whether or not one or more assembled items have been tampered with or damaged. Sealing of the assembled items can be done according to custom agency standards, weather protection needs, tamper prevention, and combinations thereof.

In an embodiment, the present machine-readable medium can have computer instructions for instructing the processor to cause manufacture of one or more additional components. The manufacturing of components can be partially or fully automated.

It is contemplated that the machine-readable medium can further have computer instructions for instructing the processor to perform steps required to physically clear a government customs inspection to enable the assembled item or a group of assembled items to pass from the security cleared space to an aircraft or other vehicle for shipment to a specific destination. The assembled item or group of assembled items could also pass from the security cleared area to the specific destination without use of an aircraft or vehicle.

A specific destination can include a customer location, such as a residence or business office, a customer designated location, such as the customs bonded area at an airport, or other locations or addresses.

The present machine-readable medium also relates to an alternative embodiment using computer instructions for receiving an assembled item, disassembling the item, and shipping the screened components using a security cleared space connected to a port authority.

In this embodiment, the machine-readable medium has computer instructions for instructing a processor to receive a first data from at least one input device with information relating to an assembled item and store the first data in the data storage. The computer instructions also instruct the processor to cause the transport the assembled item to a disassembly area within the security cleared space for disassembly, which can be partially or frilly automated.

The computer instructions also instruct the processor to receive a second data that the assembled item has been disassembled into at least one screened component. The computer instructions further cause the screened component to be assigned a manifest.

The computer instructions additionally instruct the processor to cause the transport of the one or more screened components to a designated storage area, a transshipment area for loading onto a vehicle, or directly onto a vehicle for shipment.

The computer instructions also instruct the processor to provide a report to at least one operator concerning at least one stage of disassembly, transport, or storage of one or more screened components, assembled items, or combinations thereof.

In this embodiment, the transportation of assembled items into the security cleared space and within the security cleared space, and the transportation of screened components into the designated storage area, the transshipment area, or into a vehicle for shipment can be partially or fully automated, as described previously, using a closed loop manufacturing system or automated assembly line including smart pallets and a computer controlled processing unit.

The disassembly process can also be facilitated through computer instructions which instruct the processor to display a list of items to be disassembled, or a message indicating the disassembly or specific items or the acquisition of specific screened components through disassembly of items.

This embodiment can also include computer instructions for instructing the processor to label screened components, seal screened components, scan labels, transmit data, and manufacture additional items or components, as described in previous embodiments.

Referring now to FIG. 1, a schematic depiction of an embodiment of a computer system useable with the contemplated embodiments is shown.

Processor 50, having data storage 52, is connected to a network 54. Network 54 can be the Internet, a local area network, a wide area network, a virtual private network, a satellite network, a cellular network, or other kinds of various networks or combinations thereof. It is contemplated that multiple processors or multiple networks can also be used.

First input device 56 and second input device 58 are depicted in communication with network 54 via a first gateway protocol 60 and a second gateway protocol 62. First input device 56 and second input device 58 can be personal digital assistants, bar code readers, keyboards, touch screens, or other tracking systems or devices, which may include a use of a microphone, a voice recognition system, or a biometric security keyed device. Any number of gateway protocols and input devices can be used, independently or simultaneously.

It is contemplated that first input device 56 and second input device 58 can access processor 50 over network 54, and both input data 66 into data storage 52 and retrieve data 66 from data storage 52. First input device 56 and second input device 58 can have one or more displays for viewing the data 66 retrieved from data storage 52. User 64 is depicted in communication with first input device 56.

Data storage 52 is depicted containing data 66, relating to one or more assembled items or components, which can be accessed by one or more users and input by one or more users.

Data 66 can include information relating to one or more components to be assembled, one or more assembled items to be stored or shipped, one or more assembled items to be disassembled, one or more screened components to be stored or shipped, and combinations thereof. Data 66 can also include data obtained by scanning labels, manifest clearance forms, and other similar information.

The processor is adapted to communicate with the manufacturer for assembly of the item, or the distribution of the item, and to communicate with the cargo facility operator or handler and the cargo plane or other aircraft being used for shipment.

Computer instructions 68 can be resident in memory, or data storage 52 of processor 50. Computer instructions 68 provide logistical instructions for application to items and components and can include but are not limited to instructions for final packaging and consolidation of items prior to shipment, customs clearance of the items prior to shipment, routing of consolidated and cleared items to be weighed, screening of cleared items prior to shipment, valuation of the items and applying insurance coverage to the items prior to shipment, and directing of the cleared, screened, weighed, valued and insured items to a particular aircraft or vehicle for transport.

Computer instructions 68 can also include instructions for automating the assembly or disassembly process, such as through use of mechanical equipment that can include smart pallets and a computer controlled processing unit. Computer instructions 68 can further include instructions for facilitating the assembly or disassembly process by displaying information, lists, messages, or instructions. Display 65 is depicted in communication with processor 50.

Figure 2:
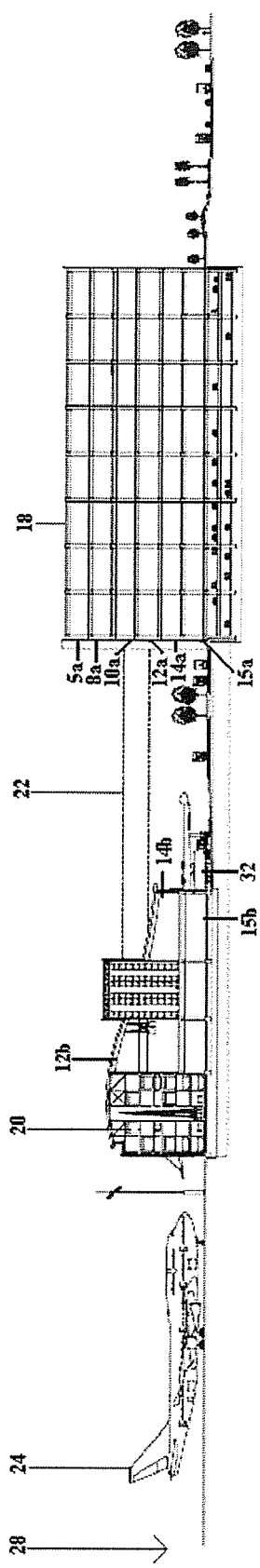
FIG. 2 depicts an axonometric view of the security cleared space for contemplated use herein with an aircraft connected to one of the security cleared buildings.

Referring now to FIG. 2, FIG. 2 depicts a contemplated security cleared space adjacent an airport. The security cleared space can be space in a building or other facility adjacent a port authority, wherein aircraft, ships, or other vehicles can land or taxi proximate to a security cleared building, facility, or space for loading or unloading. The security cleared space can be a single zone within a security cleared building, or it can be a plurality of zones, as depicted in FIG. 2.

FIG. 2 depicts a security cleared space including two multiple floor buildings. Air side building 20 is depicted having floors 12b, 14b, and 15b. It is contemplated that an aircraft 24, or other vehicles can deliver components for assembly or assembled items for disassembly to air side building 20. Aircraft 24 can also ship components or items out of the security cleared space. Each of floors 12b, 14b, and 15b can be used for any purpose, including parking, storage, packaging, distribution, transport, and other purposes. Air side building 20 can have any number of floors.

Air side building 20 is connected to a non-air side building 18 via a secure connector bridge 22. While secure connector bridge 22 is depicted as an elevated skyway, secure connector bridge 22 can also be a surface-level walkway or hallway or an underground tunnel. Secure connector bridge 22 can include conveyor belts, power rollers, and similar equipment to facilitate transport of assembled or disassembled items between air side building 20 and non-air side building 18.

Non-air side building 18 is depicted having floors 5a, 8a, 10a, 12a, 14a, and 15a. Each of floors 5a, 8a, 10a, 12a, 14a, and 15a can include one or more assembly areas, parking areas, pallet buildup and breakdown areas, storage areas, receiving and shipping areas, and vertical conveyance systems for transporting assembled and disassembled items between floors. It is contemplated that individual floors and individual areas of floors can be leased to individual users. It is further contemplated that individual floors and individual areas of floors can be adapted and customized as needed for assembly and disassembly of specific items. Non-air side building 18 can have any number of floors.

While non-air side building 18 is depicted as a multilevel building, non-air side building 18 could also be a single story building containing multiple assembly and disassembly areas within the single story.

The security cleared space is depicted adjacent an airport runway 28. Airport runway 28 could also be a seaport, a truck or rail depot, or any other area where transportation and cargo vehicles can arrive and depart. Additional surface transport devices, such as truck 32, can be used to facilitate transport of assembled and disassembled items between air side building 20 and non-air side building 18. Additional vehicles, such as truck 32, can also be used to deliver items or components to the security cleared space and to ship items or components from the security cleared space.

Figure 3:
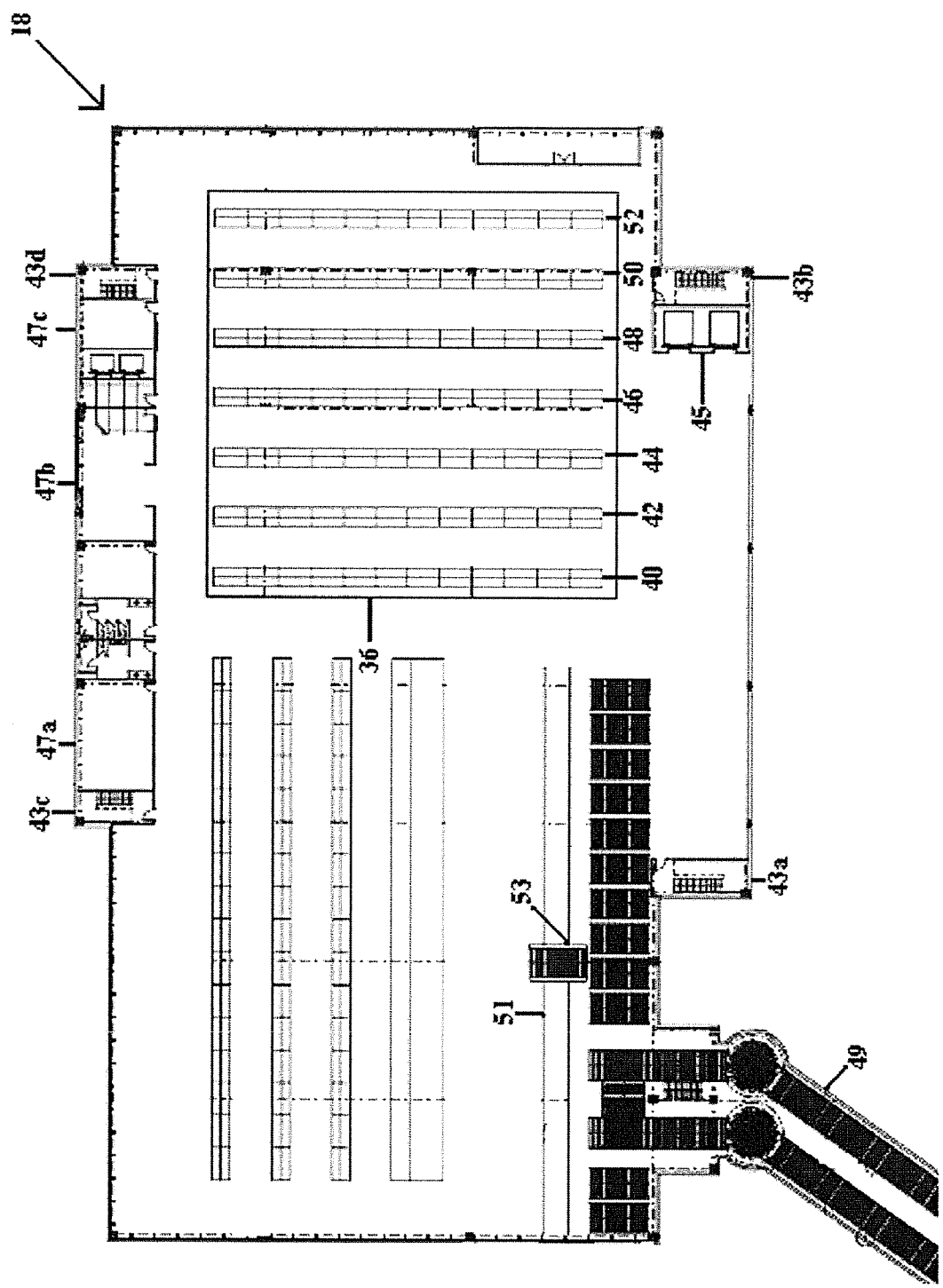
FIG. 3 depicts a detailed view of an assembly floor within a non-air side building of the security cleared space.

FIG. 3 depicts a contemplated interior of a level of non-air side building 18. An assembly area 36 for assembling items for shipment, is depicted. Assembly area 36 can also be a disassembly area. Assembly area 36 includes assembly lines 40, 42, 44, 46, 48, 50, and 52. Assembly lines 40, 42, 44, 46, 48, 50, and 52 can include assembly equipment, conveyer belts and power rollers, and other similar items for assembly or disassembly of items. One or more persons may individually or simultaneously operate or perform tasks at any of assembly lines 40, 42, 44, 46, 48, 50, and 52. It is also contemplated that one or more assembly steps can be performed using automated means and machinery. Each of assembly lines 40, 42, 44, 46, 48, 50, and 52 could independently assemble or disassemble identical or different items or components, or perform a single step in an assembly or disassembly process. The assembly area 36 could include groups of individual modules or similar groups of assembly stations that are connected together, either mechanically or electronically.

Persons for use on the assembly line can be employees of the user, independent contractors to the user, a temporary service providing temporary labor to the user, an employee leasing service, officers and directors or other executives of the user, or combinations thereof.

First conveyer belt 49 connects non-air side building 18 to air side building 20, depicted in FIG. 2. It is contemplated that first conveyer belt 49 can be integral to secure connector bridge 22, depicted in FIG. 2. First conveyer belt 49 can be used to transport items or components to and from non-air side building 18.

Second conveyer belt 51 is depicted transporting item 53 to assembly area 36. First conveyer belt 49 and second conveyer belt 51 can be separate conveyer belts, or connected. Any arrangement of conveyer belts or other machinery can be used to facilitate transport of items and components to and from non-air side building 18 and assembly area 36.

FIG. 3 also depicts adjacent areas 47a, 47b, and 47c. Adjacent areas 47a, 47b, and 47c can be used for storing items or components. Adjacent areas 47a, 47b, and 47c can also be pallet buildup and breakdown areas, additional assembly areas, truck docks or receiving areas, or locations for vertical conveyance systems. In a contemplated embodiment, adjacent areas 47a, 47b, and 47c can include elevators, stairways, or other connections to adjacent office space. The office space can be located on a separate office floor, or it can be located on the same floor as the related assembly area.

FIG. 3 further depicts vertical conveyance system 45, which can be any type of lift, elevator, including a freight elevator, or any other type of vertical conveyance system useable to transport items, components, groups of items, groups of components, pallets, packaged items and components, and other items and equipment between floors of non-airside building 18. It is contemplated that multiple vertical conveyance systems can be used. Any number of any type of vertical conveyance system could be used.

Stairways 43a, 43b, 43c, and 43d are also depicted. Stairways 43a, 43b, 43c, and 43d can connect one or more floors of non-air side building 18.

Figure 4:
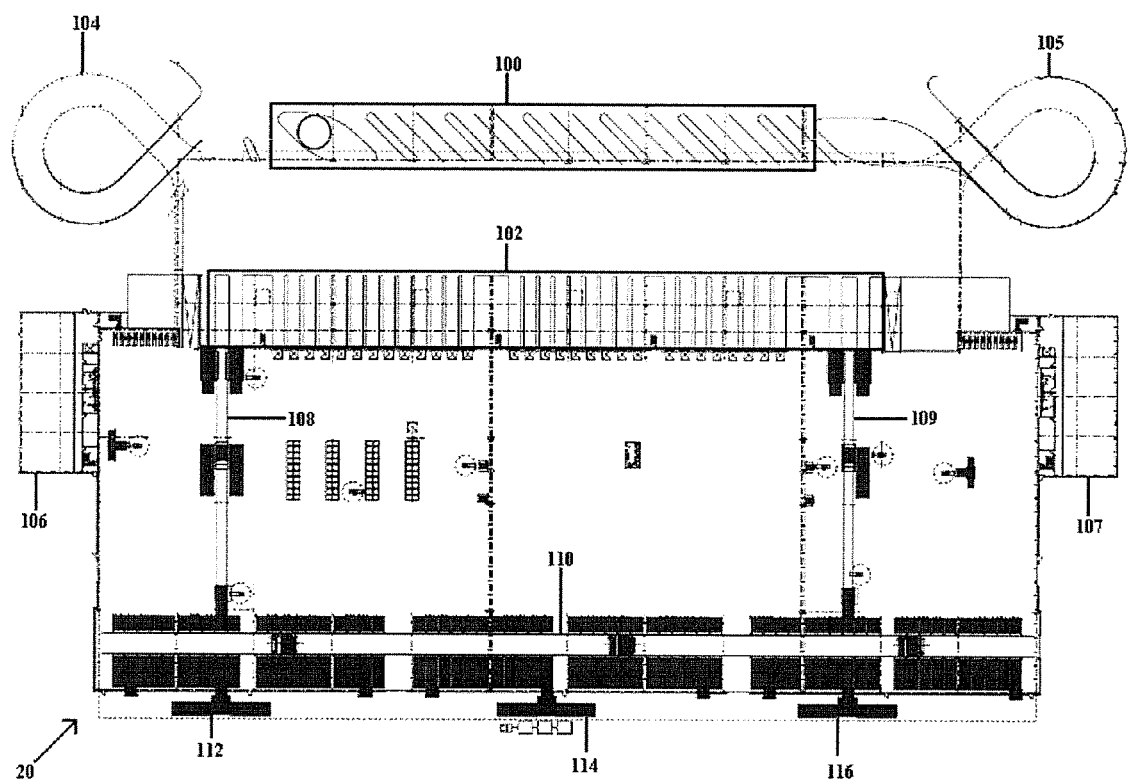
FIG. 4 depicts a detailed view of an import floor within an air side building of the security cleared space.

FIG. 4 depicts a contemplated interior of a level of air side building 20. Parking area 100 is adjacent to air side building 20. While FIG. 3 depicts parking area 100 adjacent to air side building 20, parking area 100 can be located remote from air side building 20. It is also contemplated that one or more levels of air side building 20 or non-air side building 18, shown in FIG. 2, can include one or more parking areas, such as underground parking areas. It is further contemplated that parking area 100 can contain trucks and other cargo vehicles that are not currently loading or unloading items or components from air side building 20.

First ramp 104 and second ramp 105 connect parking area 100 to truck docks 102, allowing trucks and other cargo vehicles to receive and unload items and components directly from air side building 20.

Items and components that enter or leave air side building 20 through truck docks 102 can be manually transported within air side building 20, loaded, or unloaded by personnel, or items and components can be transported using automated means.

FIG. 4 depicts first conveyer belt 108, second conveyer belt 109, and third conveyer belt 110 for transporting items and components within the depicted level of air side building 20. FIG. 3 further depicts first adjacent space 106 and second adjacent space 107 which include vertical conveyance means, such as ASRM vertical conveyance systems, for transporting items and components between levels of air side building 20. Any number of vertical conveyance means can be included within any levels of air side building 20.

At least one vertical conveyance means can transport items and components a floor of air side building 20 containing secure connector bridge 22, depicted in FIG. 1, to allow items and components to be transported to and from non-air side building 18.

Air side building 20 also includes first cargo way 112, second cargo way 114, and third cargo way 116, for receiving delivered items and components and for loading assembled or disassembled items into aircraft or other port authority vehicles.

Figure 5:
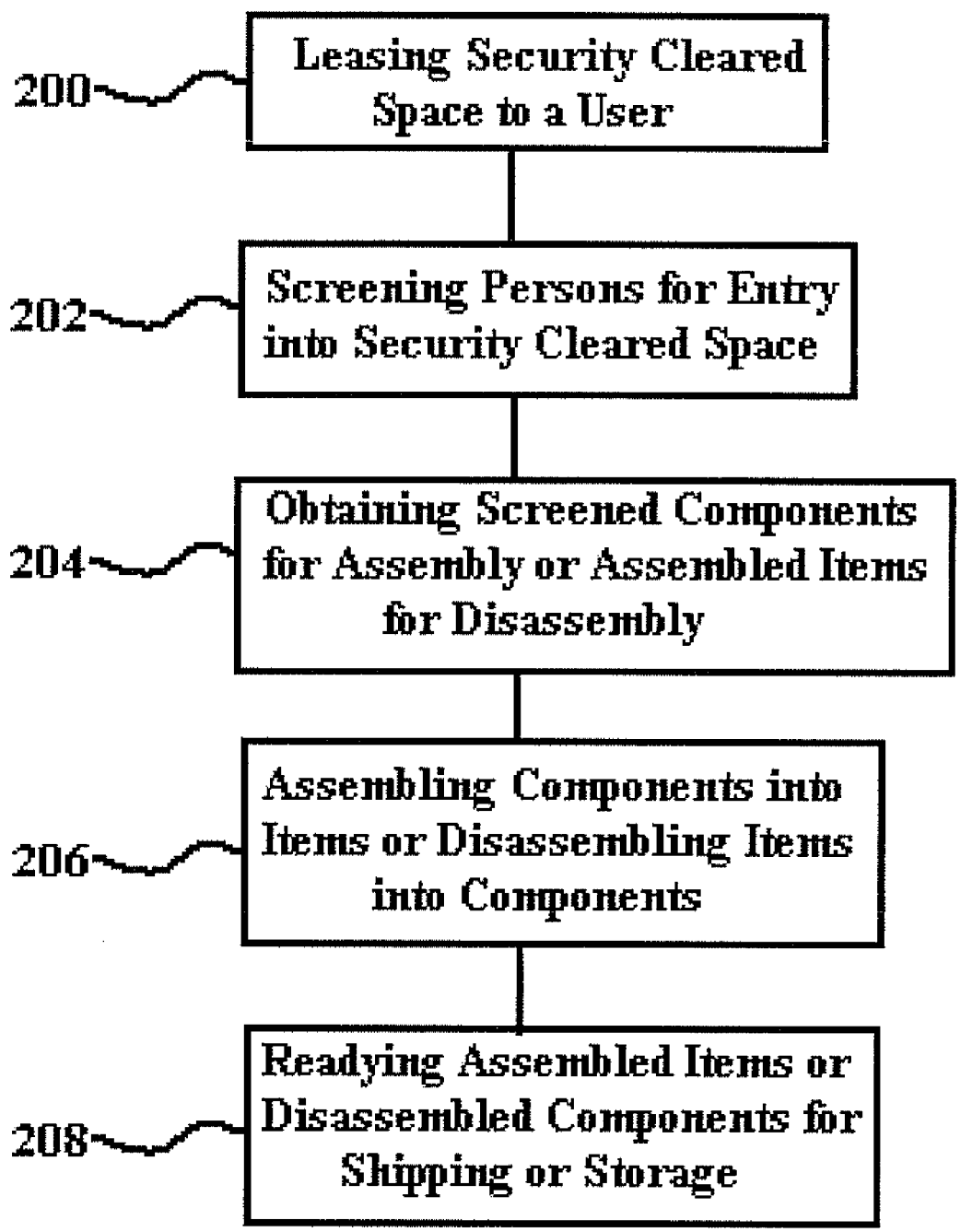
FIG. 5 depicts a flowchart of an embodiment of a method for assembling and shipping an item or disassembling and shipping components using the present machine-readable medium.

FIG. 5 depicts a flowchart of an embodiment of a contemplated method for assembling and shipping an item or disassembling an item and shipping components useable with the present machine-readable medium.

As depicted in FIG. 5, step 200 is leasing a security cleared space to a user for assembly of an item. The security cleared space is connected to an airport and is a secured area meeting United States Transportation Security Administration and International Air Transport Association requirements for cargo security policies.

Step 202 is screening one or more persons for entering the security cleared space. The one or more persons can operate an assembly or disassembly line, which can include unloading items or components shipped to the security cleared site or readying assembled items or disassembled screened components for shipping from the security cleared site to a destination. It is contemplated that the screening of each person is performed according to United States Transportation Security Administration and International Air Transport Association requirements.

Step 204 is obtaining components for assembly or items for disassembly. Components for assembly or items for disassembly can be obtained from a land based vessel, a sea based vessel, an air based vessel, or combinations thereof. Components for assembly and items for disassembly can also be stored within the security cleared space, or manufactured within the security cleared space. It is contemplated that the components or assembled items delivered to the security cleared space are screened according to the United States Transportation Security Administration and International Air Transport Association requirements.

Step 206 is assembling items from components, or disassembling items into components. This can be done using an assembly line in the security cleared space, other assembly processes or equipment, or through an automated process, such as using smart pallets and a computer controlled processing unit.

Step 208 is readying the assembled item or disassembled screened components for shipment to a destination or for storage. This can be done by entering data related to the assembled item or disassembled screened components into a processor comprising computer instructions that direct the processor to direct the assembled items or disassembled components to a designated storage area or to an aircraft or other vehicle or vessel connected to the security cleared space for shipment. Readying assembled items or disassembled screened components for shipment or storage can also include labeling or sealing one or more items or components, obtaining insurance coverage, or passing one or more physical customs inspections.

While these embodiments have been described with emphasis on the embodiments, it should be understood that within the scope of the appended claims, the embodiments might be practiced other than as specifically described herein.

What is claimed is:

1. A machine-readable medium connected to at least one network having a processor, a data storage, at least one input device, and a display, containing computer instructions for instructing a processor to:
   receive first data from the at least one input device with information related to at least one component for assembly of at least one assembled item, wherein the at least one component has been screened according to International Air Transport Association and United States Transportation Security Administration requirements;
   store the first data in the data storage;
   cause the transport of at least one of the components related to the first data to an assembly area in a security cleared space, wherein the security cleared space is connected to a port authority and is a secured area meeting International Air Transport Association requirements and United States Transportation Security Administration requirements for cargo security policies;
   cause the assembly of the components in the assembly area of the security cleared space into the at least one assembled item;
   receive second data that the components have been assembled into the at least one assembled item;
   cause the at least one assembled item to be assigned a manifest;
   cause the transport of the at least one assembled item to a designated storage area within the security cleared space or to a transshipment area within the security cleared space for loading onto a vehicle connected to the security cleared space in compliance with International Air Transport Association and United States Transportation Security Administration requirements for shipment; and
   provide a report to at least one operator concerning at least one stage of assembly, transport, or storage of at least one component, at least one assembled item, or combinations thereof.

2. The machine-readable medium of claim 1, further comprising computer instructions for instructing the processor to display on the display a list of assembled items to be assembled from the at least one component at the assembly area.

3. The machine-readable medium of claim 1, further comprising computer instructions for causing the processor to display on the display a message that the at least one assembled item is to be assembled from the at least one component at the assembly area.

4. The machine-readable medium of claim 1, further comprising computer instructions for transferring first data, second data or combinations thereof, through at least two gateway protocols using the at least one input device.

5. The machine-readable medium of claim 1, further comprising computer instructions for instructing the processor to label each at least one assembled item.

6. The machine-readable medium of claim 5, wherein the label is a bar code, a radio frequency identification tag, a check character, text, or combinations thereof.

7. The machine-readable medium of claim 6, further comprising computer instructions for instructing the processor to scan the label, forming scanned data, transmit the scanned data to at least one insurance carrier for initiating insurance coverage for a member of the group consisting of: a manufacturer, an assembler, a broker, a forwarder, a shipper, a carrier, a customer, or combinations thereof, and archive the scanned data in the data storage.

8. The machine-readable medium of claim 5, wherein the label comprises a manifest clearance form for enabling clearing of the at least one assembled item.

9. The machine-readable medium of claim 8, further comprising computer instructions for instructing the processor to scan the manifest clearance form, forming scanned manifest data, transmit the scanned manifest data to the at least one network and a designated internet protocol address for enabling clearing of the at least one assembled item while en route from the security cleared space to a delivery point outside the security cleared space, and archive the scanned data in the data storage.

10. The machine-readable medium of claim 1, further comprising computer instructions for instructing the processor to activate a means for sealing to seal the at least one assembled item according to a member of the group comprising: custom agency standards, weather protection needs, tamper prevention, and combinations thereof.

11. The machine-readable medium of claim 10, wherein the means for sealing is performed using a member of the group comprising: at least one aluminum metal container, at least one cargo net, tamper proof tape, at least one tamper proof crate, and combinations thereof.

12. The machine-readable medium of claim 1, further comprising computer instructions for directing an automated assembly line using smart pallets and a computer controlled processing unit.

13. The machine-readable medium of claim 1, further comprising computer instructions for instructing the processor to cause manufacture of additional components.

14. A machine-readable medium connected to at least one network having a processor, a data storage, at least one input device, and a display, containing computer instructions for instructing a processor to:
   receive first data from the at least one input device with information related to at least one assembled item for disassembly of the at least one assembled item into at least one screened component, wherein the at least one assembled item has been screened according to International Air Transport Association and United States Transportation Security Administration requirements;

store the first data in the data storage;

cause the transport of at least one of the assembled items related to the first data to a disassembly area in a security cleared space, wherein the security cleared space is connected to a port authority and is a secured area meeting International Air Transport Association requirements and United States Transportation Security Administration requirements for cargo security policies;

cause the disassembly of the assembled item in the disassembly area of the security cleared space into the at least one screened component;

receive second data that the assembled item has been disassembled into the at least one screened component;

cause the at least one screened component to be assigned a manifest;

cause the transport of the at least one screened component to a designated storage area within the security cleared space or to a transshipment area within the security cleared space for loading onto a vehicle connected to the security cleared space in compliance with International Air Transport Association and United States Transportation Security Administration requirements for shipment; and provide a report to at least one operator concerning at least one stage of disassembly, transport, or storage of at least one screened component, at least one assembled item, or combinations thereof.

15. The machine-readable medium of claim 14, further comprising computer instructions for instructing the processor to display on the display a list of screened components to be obtained from disassembly of the at least one assembled item at the disassembly area.

16. The machine-readable medium of claim 14, further comprising computer instructions for causing the processor to display on the display a message that the at least one screened component is to be obtained from disassembly of the at least one assembled item.

17. The machine-readable medium of claim 14, further comprising computer instructions for transferring first data, second data or combinations thereof, through at least two gateway protocols using the at least one input device.

18. The machine-readable medium of claim 14, further comprising computer instructions for instructing the processor to label each at least one screened component.

19. The machine-readable medium of claim 18, wherein the label is a bar code, a radio frequency identification tag, a check character, text, or combinations thereof.

20. The machine-readable medium of claim 19, further comprising computer instructions for instructing the processor to scan the label, forming scanned data, transmit the scanned data to at least one insurance carrier for initiating insurance coverage for a member of the group consisting of: a manufacturer, an assembler, a broker, a forwarder, a shipper, a carrier, a customer, or combinations thereof, and archive the scanned data in the data storage.

21. The machine-readable medium of claim 18, wherein the label comprises a manifest clearance form for enabling clearing of the at least one screened component.

22. The machine-readable medium of claim 21, further comprising computer instructions for instructing the processor to scan the manifest clearance form, forming scanned manifest data, transmit the scanned manifest data to the at least one network and a designated internet protocol address for enabling clearing of the at least one screened component while en route from the security cleared space to a delivery point outside the security cleared space, and archive the scanned data in the data storage.

23. The machine-readable medium of claim 14, further comprising computer instructions for instructing the processor to activate a means for sealing to seal the at least one screened component according to a member of the group comprising: custom agency standards, weather protection needs, tamper prevention, and combinations thereof.

24. The machine-readable medium of claim 23, wherein the means for sealing is performed using a member of the group comprising: at least one aluminum metal container, at least one cargo net, tamper proof tape, at least one tamper proof crate, and combinations thereof.

25. The machine-readable medium of claim 14, further comprising computer instructions for directing an automated assembly line using smart pallets and a computer controlled processing unit.

26. The machine-readable medium of claim 14, further comprising computer instructions for instructing the processor to cause manufacture of additional components.

* * * * *